(12) United States Patent
Harris et al.

(10) Patent No.: US 9,223,816 B2
(45) Date of Patent: Dec. 29, 2015

(54) OPENING A DATA SET

(71) Applicant: International Business Machines Corporation, Armonk, NY (US)

(72) Inventors: Eric J. Harris, Vail, AZ (US); Franklin E. McCune, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 13/900,000

(22) Filed: May 22, 2013

(65) Prior Publication Data

US 2014/0351293 A1  Nov. 27, 2014

(51) Int. Cl.
*G06F 17/30* (2006.01)

(52) U.S. Cl.
CPC .... *G06F 17/30312* (2013.01); *G06F 17/30091* (2013.01); *G06F 17/30289* (2013.01); *G06F 17/30339* (2013.01); *G06F 17/30386* (2013.01)

(58) Field of Classification Search
None
See application file for complete search history.

(56) References Cited

U.S. PATENT DOCUMENTS

| 5,127,094 | A | 6/1992 | Bono | |
|---|---|---|---|---|
| 8,392,661 | B1* | 3/2013 | Metcalf | 711/133 |
| 8,539,155 | B1* | 9/2013 | Miao et al. | 711/121 |
| 8,799,624 | B1* | 8/2014 | Griffin et al. | 712/29 |
| 9,063,825 | B1* | 6/2015 | Bao, Liewei | 1/1 |
| 2012/0005449 | A1 | 1/2012 | Reed et al. | |
| 2012/0054771 | A1* | 3/2012 | Krishnamurthy et al. | 718/105 |
| 2013/0054887 | A1 | 2/2013 | Ho et al. | |

OTHER PUBLICATIONS

Rogers et al. "z/OS Diagnostic Data Collection and Analysis", IBM Redbooks, 2005. pp. 1-270. © Copyright International Business Machines Corporation.
Tzortzatos, E., "z/OS Basics: Virtual Storage Management (VSM) Overview", IBM, 2009. Pages 1-68. © Copyright International Business Machines Corporation.

* cited by examiner

*Primary Examiner* — Dung K Chau
(74) *Attorney, Agent, or Firm* — Jonathan V. Sry; Robert M. Sullivan

(57) ABSTRACT

A method of and system for opening a data set is disclosed. The method and system may include structuring a storage facility to have address spaces. The address spaces may include a first address space having an open manager. The open manager may be configured and arranged to manage activities associated with an open request in response to receiving the open request. The method and system may include performing pseudo-opens associated with the open request in the address spaces. The method and system may include performing a batch-open utilizing the pseudo-opens and a resource used to complete the open request.

18 Claims, 4 Drawing Sheets

OPENING A DATA SET

TECHNICAL FIELD

This disclosure relates generally to monitoring computer systems and, more particularly, relates to opening a data set.

BACKGROUND

The amount of data that needs to be managed by enterprises is growing at an extremely high rate. Database management systems can utilize significant amounts of resources when opening data sets. Opening multiple data sets within a given time period can utilize especially significant amounts of resources. The utilization of such amounts of resources may present burdens.

SUMMARY

Aspects of the disclosure may include a method of and system for opening a data set. The method and system may include structuring a storage facility to have address spaces. The address spaces may include a first address space having an open manager. The open manager may be configured and arranged to manage activities associated with an open request in response to receiving the open request. The method and system may include performing pseudo-opens associated with the open request in the address spaces. The method and system may include performing a batch-open utilizing the pseudo-opens and a resource used to complete the open request.

Aspects of the disclosure may include the pseudo-opens building a control block. The pseudo-opens may gather information related to a data set that is used to open the data set. In embodiments, the batch-open may be performed in response to achieving a defined specification. The defined specification may be related to the pseudo-opens. The defined specification may include a chronological threshold. The defined specification may include a performed pseudo-open threshold. In embodiments, performing the batch-open may include aggregating the pseudo-opens. Performing the batch-open may include obtaining the resource required to complete the open request. The resource may include a task input-output table (TIOT). The batch-open may be performed in the first address space. Aspects of the disclosure may reduce the likelihood of deadlocks or resource contention.

DETAILED DESCRIPTION

Opening a data set may include utilizing a particular resource. When opening multiple data sets the particular resource may be required before each open completes. Specifically, a task input-output table (TIOT) may be the particular resource. Certain applications can open thousands of data sets at once. A specific TIOT may need to be obtained for each of the thousands of data sets. Unique enqueues (e.g., additional items added to the queue) may be required. As such, bottlenecks in the process of opening a data set can occur (particularly when multiple open requests are issued at effectively the same time). Such bottlenecks can lead to deadlocks or resource contention. Efficiently opening data sets in a streamlined fashion may reduce the likelihood of deadlocks or resource contention when opening multiple data sets.

Aspects of the disclosure may relate to the opening of one or more data sets stored within a storage facility. The storage facility may be structured to have address spaces. The address spaces may include a first address space. The first address space may have an open manager. The open manager may be configured and arranged to manage activities associated with an open request in response to receiving the open request. A first pseudo-open associated with the open request may be performed in a second address space of the address spaces. A second pseudo-open associated with the open request may be performed in a third address space of the address spaces. A batch-open utilizing the first and second pseudo-opens and a resource used to complete the open request may be performed.

In embodiments, at least one of the first and second pseudo-opens may include building a control block. At least one of the first and second pseudo-opens may include gathering information related to a data set and that is used to open the data set. The activities associated with an open request may include the first and second pseudo-opens and the batch-open. In embodiments, the batch-open may be performed in response to achieving a defined specification. The defined specification may be related to the first and second pseudo-opens. The defined specification may include a chronological threshold. The defined specification may include a performed pseudo-open threshold. In embodiments, performing the batch-open may include aggregating the first and second pseudo-opens. Performing the batch-open may include obtaining the resource used to complete the open request. The resource may include a task input-output table (TIOT). The batch-open may be performed in the first address space. Aspects of the disclosure may reduce the likelihood of deadlocks or resource contention.

Figure 1:
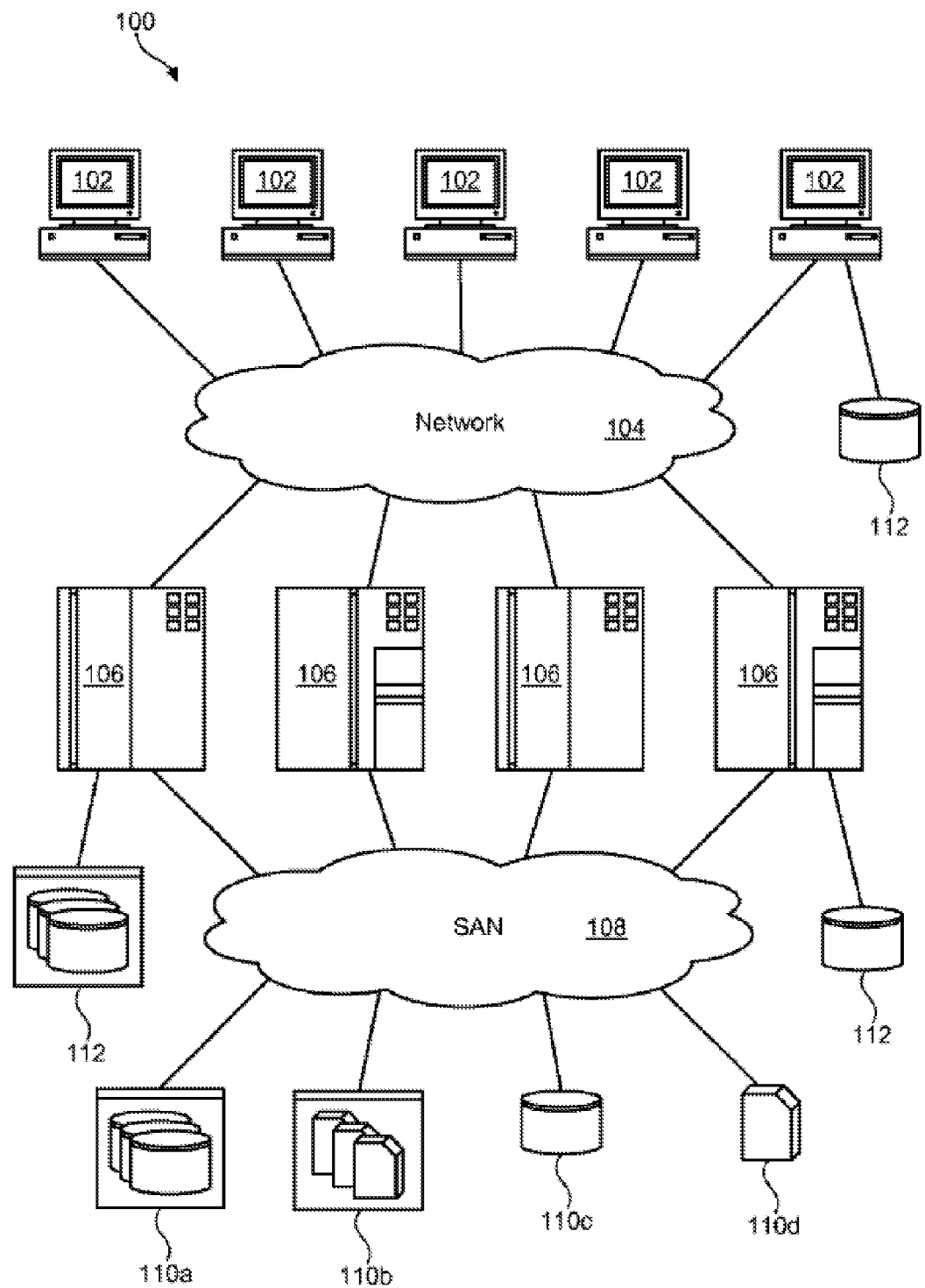
FIG. 1 illustrates an example network architecture according to embodiments.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

Figure 2:
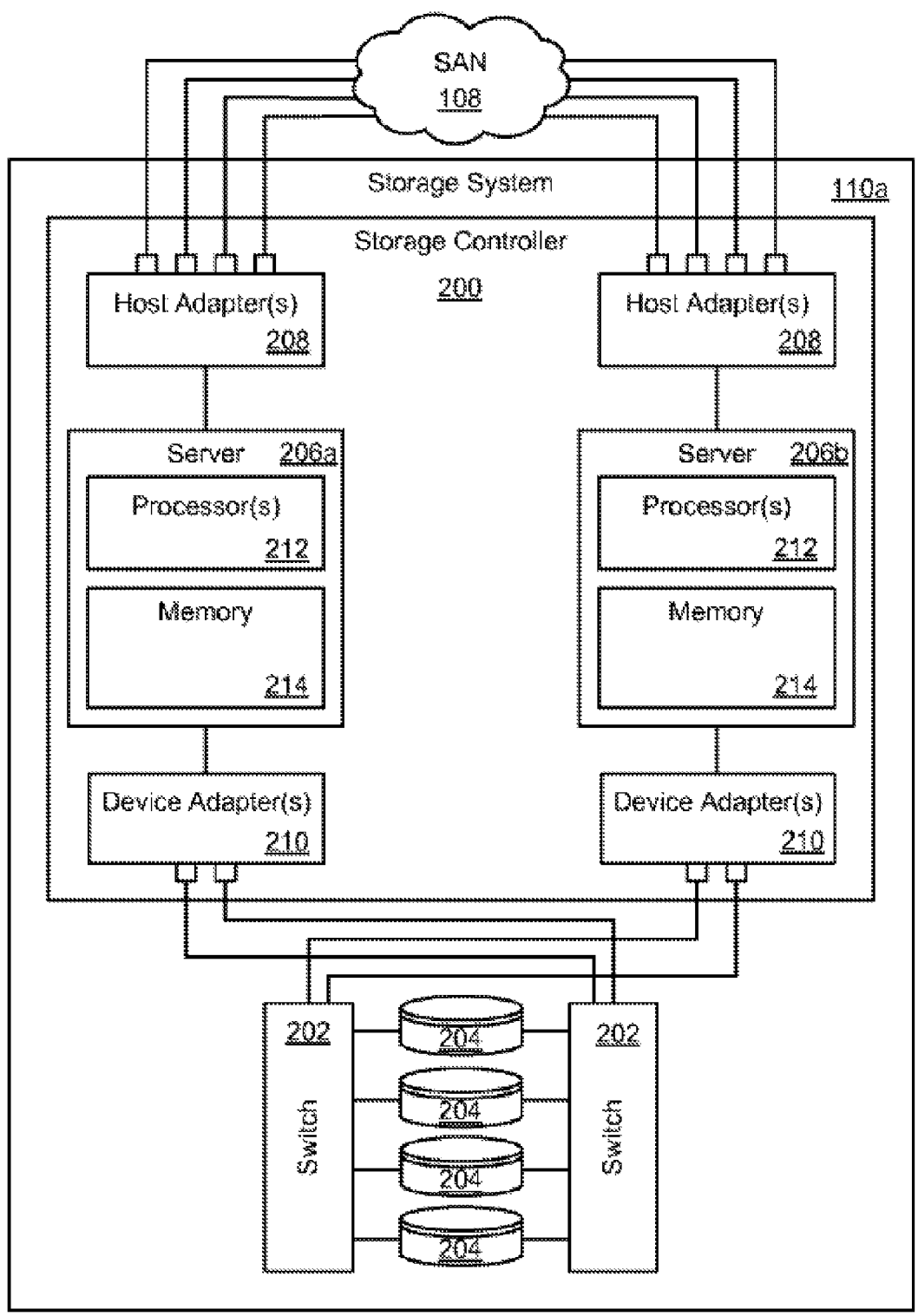
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to open data sets associated with such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
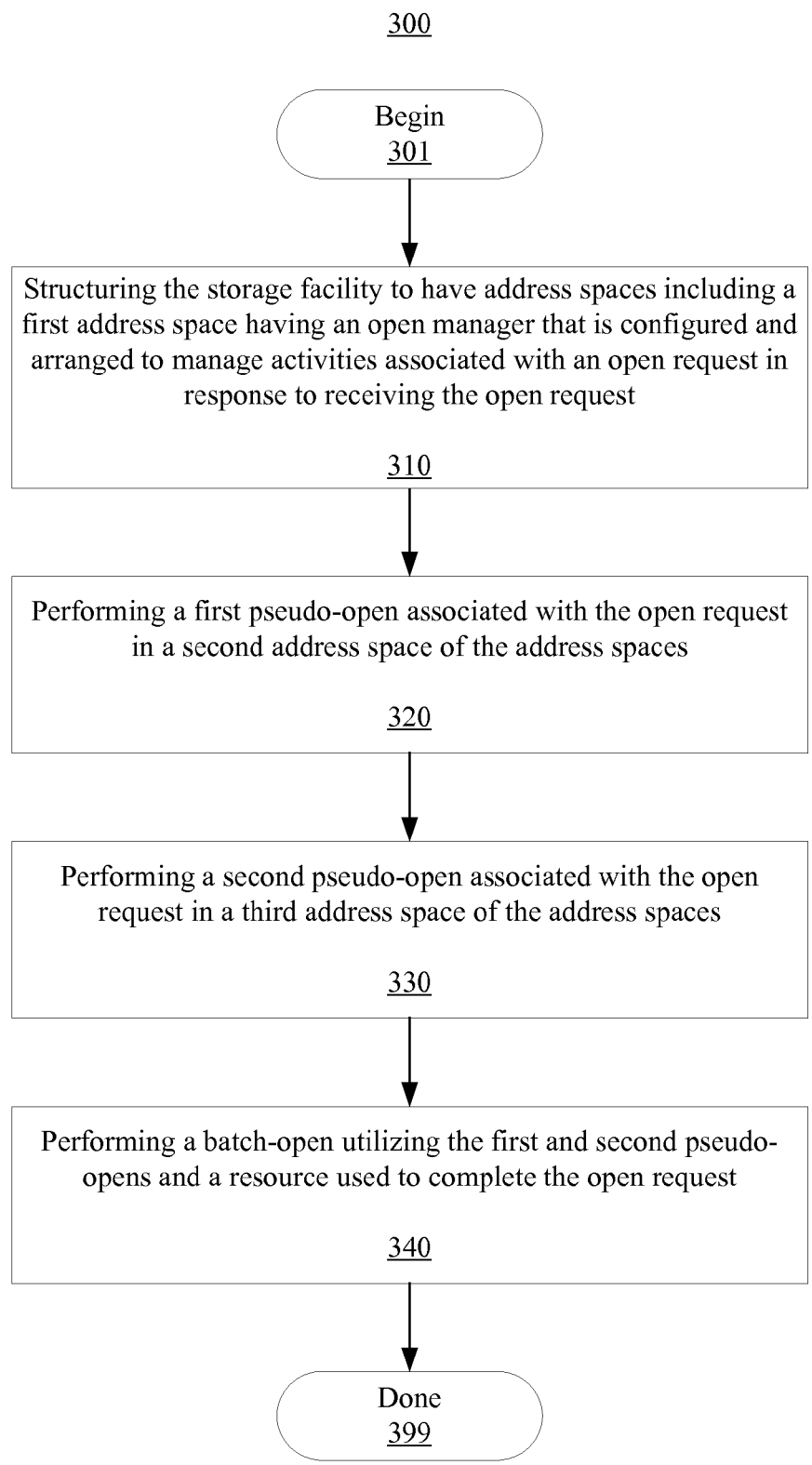
FIG. 3 is a flowchart illustrating a method for opening a data set according to embodiments.

FIG. 3 is a flowchart illustrating a method 300 for opening a data set according to embodiments. Method 300 may include opening the data set in a storage facility. Method 300 may begin at block 301. The storage facility may be structured to have address spaces at block 310. In embodiments, an address space may be a range of contiguous virtual storage addresses that a system creates for a user, a job, or a task. In embodiments, the address space can range, for example, up to sixteen exabytes of contiguous virtual storage addresses that the system creates for the user. The address space may include user data and programs, as well as system data and programs, some of which are common to all address spaces. The address spaces may include a first address space. The first address space may have an open manager. The open manager may be configured and arranged to manage activities associated with an open request in response to receiving the open request. In embodiments, the activities associated with an open request may include pseudo-opens and a batch-open. Managing the activities may include coordinating or performing the activities. Coordinating the activities may include organizing or distributing work to be performed.

Pseudo-opens may consist of performing partial actions (e.g., work) needed to perform the open request (e.g., a pseudo-open may be considered to be a partial open). Pseudo-opens associated with the open request may be performed in the address spaces. A first pseudo-open associated with the open request may be performed in a second address space of the address spaces at block 320. A second pseudo-open associated with the open request may be performed in a third address space of the address spaces at block 330. The pseudo-opens may include building control blocks. Control blocks may manage work and resources. The pseudo-opens may include gathering information related to a data set and that is used to open the data set. The information gathered by the pseudo-opens may be required to open the data set. In an example embodiment, the actual work done on behalf of the pseudo-opens may consist of control block building and gathering data set information that is required to open data sets. For instance, a single pseudo open may build ten percent of the control blocks (e.g., a partial number of the control blocks) needed to be built to perform the open request.

Pseudo-opens may involve multiple address spaces that can work in parallel to open (e.g., allocate) data sets. The address space that is initially in control (e.g., the first address space) may spawn address spaces (e.g., create the second and third address spaces) or use previously allocated address spaces (e.g., use the second and third address spaces) to handle the work of the opens (allocations). In embodiments, the open manager may exist on the first address space to organize and distribute the workload evenly among the second and third address spaces which are to perform the pseudo-opens. The distribution of the work via pseudo-opens may reduce competition between ongoing work in the first address space and the individual open requests that may require a particular resource exclusively. In the case of when the particular resource is address space specific, the pseudo-opens (which are distributed) may not compete against each other. Moreover, other ongoing work in the address spaces may include catalog locates or extend processing. The other ongoing work may require shared access to the particular resource which may reduce the speed in which the particular resource may be obtained exclusively by open processing.

In an embodiment, a possible organizational design may identify address spaces by a number and the open manager in the first address space may manage activities by sending work to the other address spaces incrementally in a round-robin style. For example, distributing work to ten other address spaces (e.g., five first pseudo-opens and five second pseudo-opens). Once each of the other address spaces contains work, the open manager may return to the address space the round-robin began on (e.g., the second address space). Once the open manger in the first address space returns to the address space it began on, the address space it began on will either have the previously work in-flight (e.g., ongoing) or be waiting for more work (e.g., having completed its original work increment). If work is in-flight, new work may be queued. In such embodiments, the actual work that is being done on behalf of the pseudo-open may consist of control block building and gathering data set information that is required to open data sets. A variety of embodiments are contemplated including but not limited to different numbers of address spaces and unique ways of managing the activities.

A batch-open utilizing the first and second pseudo-opens and a resource used to complete the open request may be performed at block 340. In embodiments, the batch-open may be performed in the first address space. In embodiments, the batch-open may be a final open action. In embodiments, the batch-open may relate to a separate database or location relative to the pseudo-opens. In embodiments, the resource may be required to complete the open request.

The batch-open may include use of a compiled set of built control blocks and information related to a data set that is used to open the data set. The use may, in effect, open the data set (e.g., perform the full open). In embodiments, performing the batch-open may include utilizing the first and second pseudo-opens by aggregating or grouping them. Aggregating the first and second pseudo-opens may include moving or merging them. For instance, the first and second pseudo-opens may be moved from the second and third address spaces to the first address space. Similarly, the first and second pseudo-opens may be merged together from the second and third address spaces to a single address space. Thus, control blocks related to the open request may be aggregated (e.g., moved or merged). In particular, upon completion of a given pseudo-open, control blocks related to the open request built during the given pseudo-open may be moved to the single address space which may be the first address space. Once enough data sets are pseudo-opened, the open manager may merge pseudo-opens in order to perform the batch-open that may require only one enqueue of the resource required to fulfill the open request.

The batch-open may include obtaining the resource used to complete the open request. The resource may be the particular resource which may be used or required for each open request of a data set. Each open request may be just one of thousands of open request by a given application. The open requests may be issued at effectively the same time. The resource may be a shared resource with shared access by a number of different tasks, jobs, users, programs, applications, etc. The resource may include a table such as a task input-output table (TIOT). The TIOT may be a specific TIOT for a given system. The TIOT may be address space specific. The resource may be the limiting factor in fulfilling the open request. The resource, such as the TIOT, may be held while the pseudo-opens occur. Holding the resource may assist in streamlined open processing. Such aspect in particular, when viewed as a whole with other aspects of the disclosure, may assist in reducing the likelihood of deadlocks or resource contention.

In embodiments, the batch-open may be performed in response to achieving a defined specification. The defined specification may be related to the first and second pseudo-opens. The point in time at which the pseudo-opens are merged for the batch-open may be specified by a user. The defined specification may include a chronological threshold. In embodiments, the chronological threshold may be an age. In embodiments, the age may be how long the open request has been in process. In an example embodiment, the batch-open may be triggered after the open request has been in process for one second. In embodiments, the chronological threshold may be an ordering of data sets by a temporal function. The temporal function may include factors such as which data sets are needed when and in what order may the data sets be used. The defined specification may include a performed pseudo-open threshold. In embodiments, the performed pseudo-open threshold may be a count of finished pseudo-opens. The count of finished pseudo-opens may include a factor of how many rounds of a round-robin distribution have successfully occurred. In an example embodiment, one success round of pseudo-opens may trigger the batch-open.

Method 300 may conclude at block 399. Aspects of method 300 may reduce the likelihood of deadlocks or resource contention. Aspects of method 300 may streamline open processing when multiple open requests are issued at effectively the same time. Bottlenecks in the process of opening data sets may be less frequent. Altogether, the opening of data sets may occur more efficiently.

Figure 4:
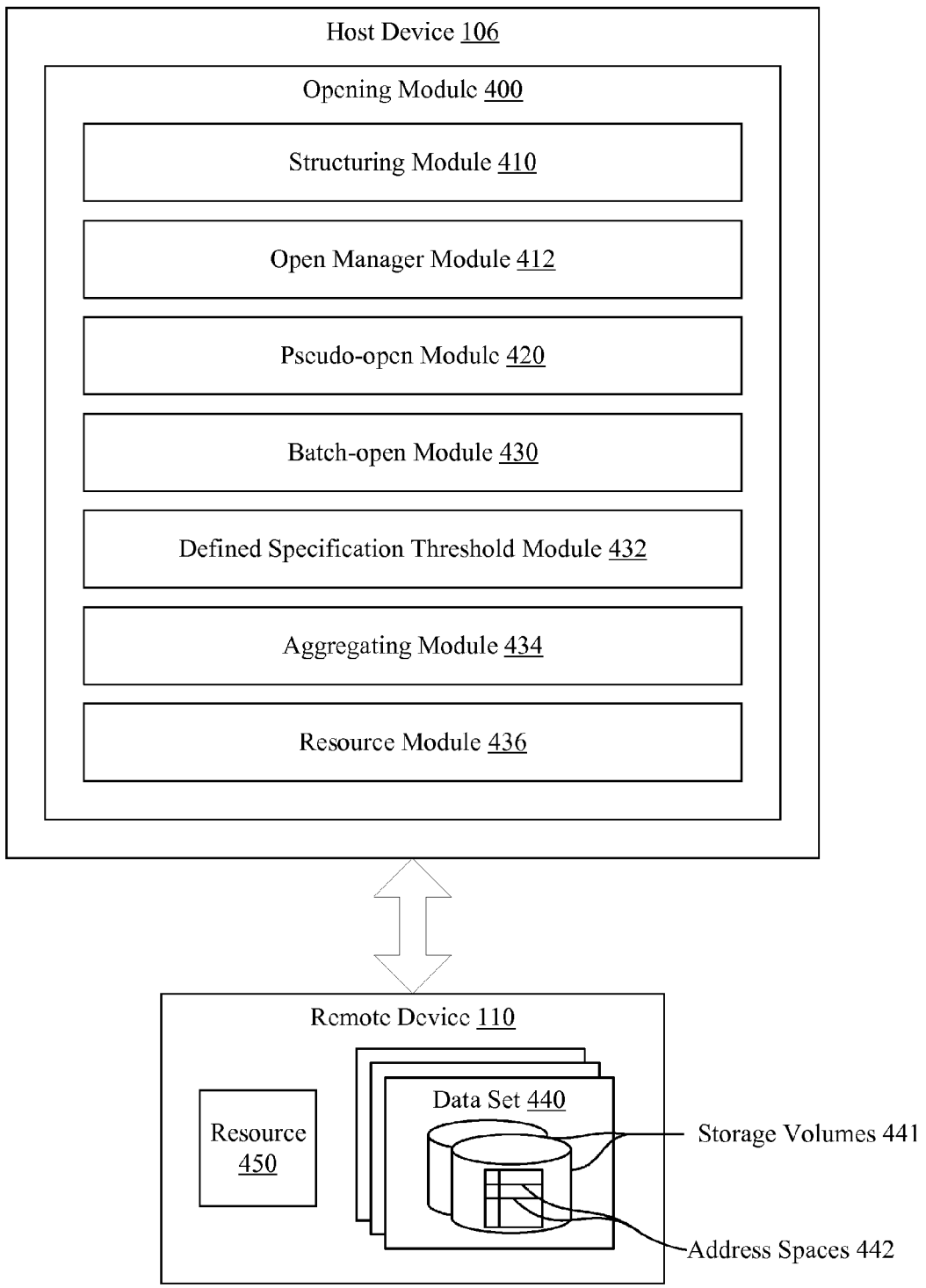
FIG. 4 shows modules of a system implementing a method according to embodiments.

FIG. 4 shows modules of a system implementing method 300 according to embodiments. In embodiments, method 300 may be implemented in the form of one or more modules. These modules may be implemented in hardware, software or firmware executable on hardware, or a combination thereof. For example, module functionality that may occur in a host system 106 may actually be implemented in a remote system 110 and vice versa. Other functionality may be distributed across the host system 106 and the remote system 110.

A host system 106 may include an opening module 400. The opening module 400 may be configured and arranged to open a data set. The opening module 400 may include opening the data set in a storage facility. The opening module 400 may include a structuring module 410, an open manager module 412, a pseudo-open module 420, a batch-open module 430, a defined specification threshold module 432, an aggregating module 434, and a resource module 436. The remote system 110 may have a data set 440 comprising storage volumes 441 having address spaces 442.

The structuring module 410 may structure or be configured and arranged to structure the storage facility to have address spaces. The address spaces may include a first address space. The first address space may have an open manager. The open manager module 412 may include the open manager which may be configured and arranged to manage activities associated with an open request in response to receiving the open request. In embodiments, the activities associated with an open request may include pseudo-opens and a batch-open. Managing the activities may include coordinating or performing the activities. Coordinating the activities may include organizing or distributing work to be performed.

The pseudo-open module 420 may perform or be configured and arranged to perform pseudo-opens associated with the open request in the address spaces. A first pseudo-open associated with the open request may be performed in a second address space of the address spaces. A second pseudo-open associated with the open request may be performed in a third address space of the address spaces. The pseudo-opens may include building control blocks. Control blocks may manage work and resources. The pseudo-opens may include gathering information related to a data set and that is used to open the data set. The information gathered by the pseudo-opens may be required to open the data set. In an example embodiment, the actual work done on behalf of the pseudo-opens may consist of control block building and gathering data set information that is required to open data sets. The pseudo-opens and embodiments thereof may be similar or the same as described above relating to FIG. 3.

The batch-open module 430 may perform or be configured and arranged to perform a batch-open utilizing the first and second pseudo-opens and a resource 450 used to complete the open request. In embodiments, the batch-open may be performed in the first address space. In embodiments, the batch-open may be a final open action. In embodiments, the batch-open may relate to a separate database or location relative to the pseudo-opens. The batch-open and embodiments thereof may be similar or the same as described above relating to FIG. 3.

In embodiments, the batch-open may be performed in response to achieving a defined specification. The defined specification may be related to the first and second pseudo-opens. The point in time at which the pseudo-opens are merged for the batch-open may be specified by a user. The defined specification may include a chronological threshold or a performed pseudo-open threshold. The defined specification threshold module 432 may be configured and arranged to set such thresholds. The batch-open may include use of a compiled set of built control blocks and information related to a data set that is used to open the data set. The use may, in effect, open the data set (e.g., perform the full open). In embodiments, performing the batch-open may include utilizing the first and second pseudo-opens by aggregating or grouping them. The aggregating module 434 may be configured and arranged to do the aggregating. The batch-open may include obtaining the resource 450 used to complete the open request. The resource 450 may include a table such as a task input-output table (TIOT). The resource module 436 may be configured and arranged to obtain the resource 450. The defined specification, aggregating the pseudo-opens, and obtaining the resource 450 as well as embodiments thereof may be similar or the same as described above relating to FIG. 3.

Aspects of opening module 400 may reduce the likelihood of deadlocks or resource contention. Aspects of opening module 400 may streamline open processing when multiple open requests are issued at effectively the same time. Bottlenecks in the process of opening data sets may be less frequent. Altogether, the opening of data sets may occur more efficiently.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer-implemented method for opening a data set in a storage facility, the method comprising:
    structuring the storage facility to have address spaces including a first address space having an open manager that is configured and arranged to manage activities associated with an open request in response to receiving the open request;
    performing a first pseudo-open associated with the open request in a second address space of the address spaces;
    performing a second pseudo-open associated with the open request in a third address space of the address spaces; and
    performing a batch-open, in response to achieving a defined specification related to the first and second pseudo-opens that includes at least one of a chronological threshold and a performed pseudo-open threshold, utilizing the first and second pseudo-opens and a resource used to complete the open request.

2. The method of claim 1, wherein at least one of the first and second pseudo-opens includes building a control block.

3. The method of claim 1, wherein at least one of the first and second pseudo-opens includes gathering information related to a data set and that is used to open the data set.

4. The method of claim 1, wherein the activities associated with an open request include the first and second pseudo-opens and the batch-open.

5. The method of claim 1, wherein the performing the batch-open includes aggregating the first and second pseudo-opens.

6. The method of claim 1, wherein the performing the batch-open includes obtaining the resource.

7. The method of claim 6, wherein the resource includes a task input-output table (TIOT).

8. The method of claim 1, wherein the batch-open is performed in the first address space.

9. A computer-implemented method for opening a data set in a storage facility, the method comprising:

structuring the storage facility to have address spaces including a first address space having an open manager that is configured and arranged to manage activities associated with an open request in response to receiving the open request;

performing a first pseudo-open associated with the open request in a second address space of the address spaces, the first pseudo-open including a control block being built;

performing a second pseudo-open associated with the open request in a third address space of the address spaces; and performing a batch-open in the first address space in response to achieving a defined specification related to the first and second pseudo-opens that includes at least one of a chronological threshold and a performed pseudo-open threshold, the batch-open aggregating the first and second pseudo-opens and obtaining a resource associated with the storage facility used to complete the open request.

10. The method of claim 9, wherein the resource includes a task input-output table (TIOT).

11. A system for opening a data set in a storage facility, comprising:

a remote device; and a host device, at least one of the remote device and the host device including:

an opening module, the opening module comprising:

a structuring module that structures the storage facility to have address spaces including a first address space having an open manager that is configured and arranged to manage activities associated with an open request in response to receiving the open request;

a pseudo-open module that performs a first pseudo-open associated with the open request in a second address space of the address spaces and performs a second pseudo-open associated with the open request in a third address space of the address spaces; and a batch-open module that performs a batch-open utilizing the first and second pseudo-opens and a resource used to complete the open request; and a defined specification threshold module that configures and arranges the batch-open to be performed in response to achieving a defined specification related to the first and second pseudo-opens that includes at least one of a chronological threshold and a performed pseudo-open threshold.

12. The system of claim 11, wherein at least one of the first and second pseudo-opens includes building a control block.

13. The system of claim 11, wherein at least one of the first and second pseudo-opens includes gathering information related to a data set and that is used to open the data set.

14. The system of claim 11, wherein the activities associated with an open request include the first and second pseudo-opens and the batch-open.

15. The system of claim 11, further comprising an aggregating module that aggregates the first and second pseudo-opens.

16. The system of claim 11, further comprising a resource module that obtains the resource.

17. The system of claim 16, wherein the resource includes a task input-output table (TIOT).

18. The system of claim 11, wherein the batch-open is performed in the first address space.

* * * * *